United States Patent
Friedrich et al.

(10) Patent No.: US 10,200,786 B1
(45) Date of Patent: Feb. 5, 2019

(54) VOLUME LIMITING THROUGH A TELEMATICS UNIT

(71) Applicant: GM GLOBAL TECHNOLOGY OPERATIONS LLC, Detroit, MI (US)

(72) Inventors: Mark P. Friedrich, Macomb Township, MI (US); Gregg R. Kittinger, Oakland Township, MI (US)

(73) Assignee: GM GLOBAL TECHNOLOGY OPERATIONS LLC, Detroit ( * ) Notice: Subject to any disclaimer, the term of this patent is extended or adjusted under 35 U.S.C. 154(b) by 0 days.

(21) Appl. No.: 15/864,104

(22) Filed: Jan. 8, 2018

(51) Int. Cl.
*H04R 3/00* (2006.01)
*H04W 4/48* (2018.01)

(52) U.S. Cl.
CPC .............. *H04R 3/00* (2013.01); *H04W 4/48* (2018.02); *H04R 2420/07* (2013.01); *H04R 2430/01* (2013.01); *H04R 2499/13* (2013.01)

(58) Field of Classification Search
CPC .. H04R 3/00; H04R 2420/07; H04R 2430/01; H04R 2499/13; H04W 4/48
USPC .......................................................... 381/86
See application file for complete search history.

(56) References Cited

U.S. PATENT DOCUMENTS

| | | | |
|---|---|---|---|
| 7,003,123 B2* | 2/2006 | Kanevsky | H04R 3/00 381/72 |
| 8,457,686 B2 | 6/2013 | Przybylski | |
| 2007/0223737 A1* | 9/2007 | Hayes, Jr. | H03G 11/00 381/104 |
| 2009/0268164 A1 | 10/2009 | Bowden | |
| 2010/0333146 A1* | 12/2010 | Pickney | B60R 11/0235 725/75 |
| 2018/0027373 A1* | 1/2018 | Wang | H04W 4/023 455/456.3 |
| 2018/0063695 A1* | 3/2018 | Kim | H04W 8/005 |
| 2018/0210698 A1* | 7/2018 | Park | G06F 3/165 |

* cited by examiner

*Primary Examiner* — Jason R Kurr (57) ABSTRACT

One general aspect includes a method of remote volume adjustment through a telematics unit of a vehicle, the method including: establishing a short-range wireless connection (SRWC), via the telematics unit, with a wireless device present within the interior of the vehicle; receiving, via the telematics unit, one or more commands to set a maximum volume level for the wireless device; and limiting, via the telematics unit, the audio output directed to the wireless device to the maximum volume level.

17 Claims, 3 Drawing Sheets

VOLUME LIMITING THROUGH A TELEMATICS UNIT

INTRODUCTION

Occupants of a vehicle often listen to audio content as entertainment while traveling. In some instances, one of the occupants chooses to listen to their own independent audio content through a pair of headphones or earbuds wirelessly connected to the vehicle's telematics unit (e.g., via the rear seat infotainment system). This is usually at the convenience of the other occupants who are uninterested in the content being played by the independent occupant. However, in some instances this occupant chooses to listen to their audio content at a volume which can be heard by others in the vehicle interior and thus burden these occupants. Moreover, listening to audio content at an unreasonably high volume could potentially harm/damage the hearing abilities of the wireless device using occupant. It would therefore be useful to enable the ability to limit the audio content volume being played through the wirelessly connected headphones/earbuds.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of remote volume adjustment through a telematics unit of a vehicle, the method including: establishing a short-range wireless connection (SRWC), via the telematics unit, with a wireless device present within the interior of the vehicle; receiving, via the telematics unit, one or more commands to set a maximum volume level for the wireless device; and limiting, via the telematics unit, the audio output directed to the wireless device to the maximum volume level. Other embodiments of this aspect include corresponding computer systems, apparatus, and computer programs recorded on one or more computer storage devices, each configured to perform the actions of the methods.

Implementations may include one or more of the following features. The method further including the step of recording, via the telematics unit, the maximum volume level setting to a memory. The method further including: directing, via the telematics unit, an audio output from a single audio source to both the wireless device and vehicle audio system. The method may also include balancing, via the telematics unit, the volume of the audio output between the wireless device and telematics unit. The method further including the step of selecting, via the telematics unit, one wireless device from a plurality of wireless devices. The method where: the telematics unit includes a display. The method may also include the steps of receiving, via the telematics unit, general identification (ID) information for at least one wireless device; establishing, via the telematics unit, a tag name for the at least one wireless devices, the tag name based on the id information; and exhibiting, via the telematics unit, the tag name on the display. The method where the SRWC protocol is Bluetooth, Bluetooth Low Energy, or Wi-Fi. The method where the wireless device is a pair of wireless headphones or wireless earbuds. Implementations of the described techniques may include hardware, a method or process, or computer software on a computer-accessible medium.

One general aspect includes a system for volume adjustment for a wireless device present in the interior of a vehicle, the system including: a memory located in a telematics unit of the vehicle, the memory including one or more executable instructions. The system also includes a controller located in the telematics unit of the vehicle, the controller configured to read and execute the one or more executable instructions; where the executable instructions enable the controller to: establish a short-range wireless connection (SRWC) with the wireless device while present within the interior of the vehicle; receive one or more commands to set a maximum volume level for the wireless device; and limit the audio output directed to the wireless device to the maximum volume level. Other embodiments of this aspect include corresponding computer systems, apparatus, and computer programs recorded on one or more computer storage devices, each configured to perform the actions of the methods.

Implementations may include one or more of the following features. The system where the executable instruction further enable the controller to record the maximum volume level setting to a memory. The system where the executable instruction further enable the controller to: direct audio output from a single audio source to both the wireless device and vehicle audio system and balance the volume of the audio output between the wireless device and telematics unit. The system where the executable instruction further enable the controller to select one wireless device from a plurality of wireless devices. The system where: the telematics unit includes a display; and the executable instruction further enable the controller to: receive general identification (ID) information for the wireless device; establish a tag name for the wireless device, the tag name based on the id information; and exhibit the tag name on the display. The system where the SRWC protocol is Bluetooth, Bluetooth Low Energy, or Wi-Fi. The system where the wireless device is a pair of wireless headphones or wireless earbuds. Implementations of the described techniques may include hardware, a method or process, or computer software on a computer-accessible medium.

One general aspect includes a non-transitory and machine-readable medium having stored thereon executable instructions adapted to adjust the volume of a wireless device present in the interior of a vehicle, which when provided to a controller located in a telematics unit in a vehicle and executed thereby, causes the controller to: establish a short-range wireless connection (SRWC) with the wireless device while present within the interior of the vehicle; receive one or more commands to set a maximum volume level for the wireless device; and limit the audio output directed to the wireless device to the maximum volume level. Other embodiments of this aspect include corresponding computer systems, apparatus, and computer programs recorded on one or more computer storage devices, each configured to perform the actions of the methods.

Implementations may include one or more of the following features. The non-transitory and machine-readable memory which further causes the controller to record the maximum volume level setting to a memory. The non-transitory and machine-readable memory which further causes the controller to: direct audio output from a single audio source to both the wireless device and telematics unit and balance the volume of the audio output between the wireless device and vehicle audio system. The non-transitory and machine-readable memory which further causes the controller to select one wireless device from a plurality of wireless devices. The non-transitory and machine-readable memory where: the telematics unit includes a display; and which further causes the controller to: receive general identification (ID) information for the wireless device; establish a tag name for the wireless device, the tag name based on the id information; and exhibit the tag name on the display. The non-transitory and machine-readable memory where the SRWC protocol is Bluetooth, Bluetooth Low Energy, or Wi-Fi. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
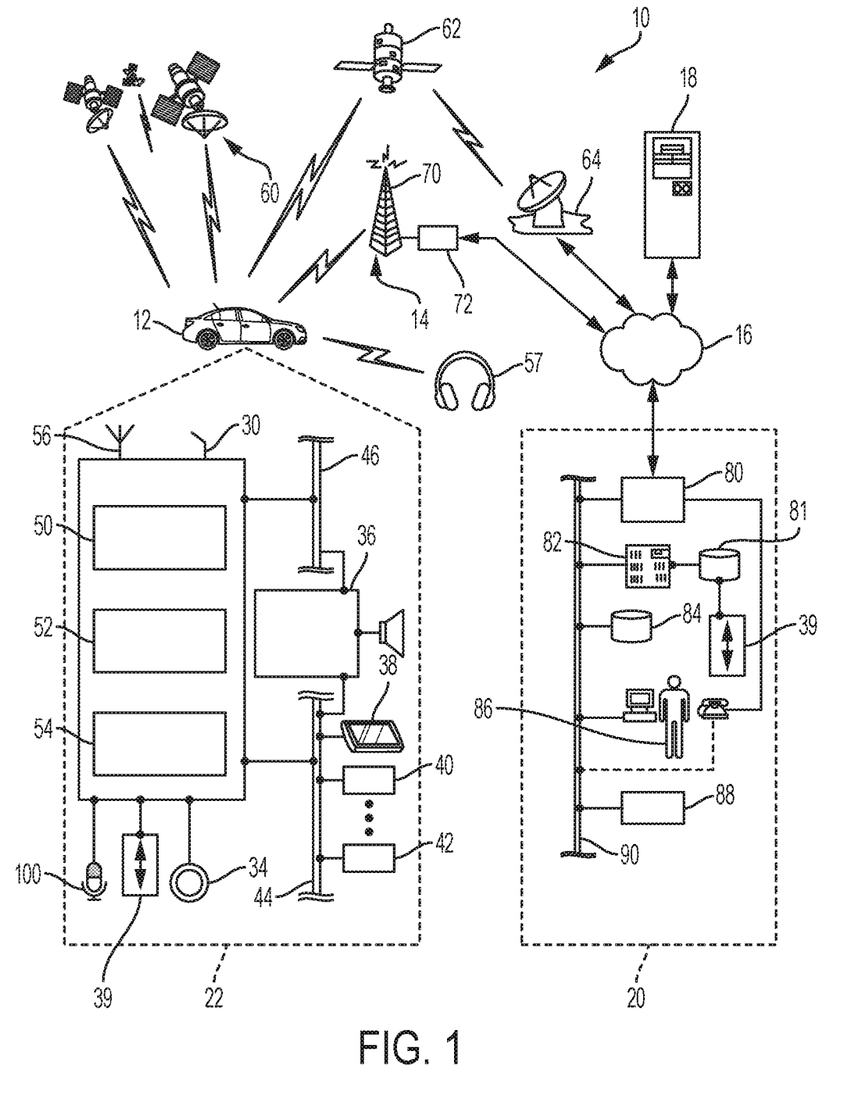
FIG. 1 is a block diagram depicting an exemplary embodiment of a communications system that is capable of utilizing the system and method disclosed herein.

With reference to FIG. 1, there is shown an operating environment that includes, among other features, a mobile vehicle communications system 10 and that can be used to implement the method disclosed herein. Communications system 10 generally includes a vehicle 12, one or more wireless carrier systems 14, a land communications network 16, a computer 18, and a data center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including, but not limited to, motorcycles, trucks, busses, sports utility vehicles (SUVs), recreational vehicles (RVs), construction vehicles (e.g., bulldozers), trains, trolleys, marine vessels (e.g., boats), aircraft, helicopters, amusement park vehicles, farm equipment, golf carts, trams, etc., can also be used. Some of the vehicle electronics 28 is shown generally in FIG. 1 and includes a telematics unit 30, a microphone 32, one or more pushbuttons or other control inputs 34, a vehicle audio system 36, a visual display 38, and a GPS module 40 as well as a number of vehicle system modules (VSMs) 42. Some of these devices can be connected directly to the telematics unit 30 such as, for example, the microphone 32 and pushbutton(s) 34, whereas others are indirectly connected using one or more network connections, such as a communications bus 44 or an entertainment bus 46. Examples of suitable network connections include a controller area network (CAN), WIFI, Bluetooth and Bluetooth Low Energy, a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket transceiver device that is installed in the vehicle and that enables wireless voice and/or data communication over wireless carrier system 14 and via wireless networking. This enables the vehicle to communicate with data center 20, other telematics-enabled vehicles, or some other entity or device. The telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor 86 or voice response unit at the data center 20) and data communication (e.g., to provide GPS location data or vehicle diagnostic data to the data center 20), the system can utilize a single call over a voice channel and switch as needed between voice and data transmission over the voice channel, and this can be done using techniques known to those skilled in the art.

According to one embodiment, telematics unit 30 utilizes cellular communication according to standards such as LTE or 5G and thus includes a standard cellular chipset 50 for voice communications like hands-free calling, a wireless modem for data transmission (i.e., transceiver), an electronic processing device 52, at least one digital memory device 54, and an antenna system 56. It should be appreciated that the modem can either be implemented through software that is stored in the telematics unit and is executed by processor 52, or it can be a separate hardware component located internal or external to telematics unit 30. The modem can operate using any number of different standards or protocols such as, but not limited to, WCDMA, LTE, and 5G. Wireless networking between vehicle 12 and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

One of the networked devices that can communicate with the telematics unit 30 is a wireless device 57, such as, for example, a pair of wireless headphones designed to be worn on or around the head over a user's ears and allow the user to listen to audio content information privately. Another exemplary wireless device 57 is a pair of earbuds consisting of units that plug into the user's ear canal. The wireless headphones 57 can include a transceiver capable of communicating over a short-range wireless communication link such as, but not limited to, WIFI and Bluetooth.

Using a short-range wireless connection (SRWC) protocol (e.g., Bluetooth/Bluetooth Low Energy or Wi-Fi), wireless headphones 57 and telematics unit 30 may pair/link one with another when within a wireless range (e.g., prior to experiencing a disconnection from the wireless network). In order to pair, wireless headphones 57 and telematics unit 30 may act in a BEACON or DISCOVERABLE MODE having a general identification (ID); SRWC pairing is known to skilled artisans. The general identifier (ID) may include, e.g., the device's name and unique identifier (e.g., serial number). Moreover, once SRWC is established, the devices may be considered bonded as will be appreciated by skilled artisans (i.e., they may recognize one another and/or connect automatically when they are in a predetermined proximity or range of one other. In other words—they may become, at least temporarily, network participants).

Telematics Controller 52 (processor) can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Telematics Controller 52 executes various types of digitally-stored instructions, such as software or firmware programs stored in memory 54, which enable the telematics unit to provide a wide variety of services. For instance, controller 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services provided in connection with one or more vehicle system modules 42 (VSM); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit 30 is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to data center 20 or other remote computer system, such as computer 18, for other purposes, such as fleet management. Also, new or updated map data can be downloaded to the GPS module 40 from the data center 20 via the telematics unit 30.

Apart from the audio system 36 and GPS module 40, the vehicle 12 can include other VSMs 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests.

As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art.

A volume-level module 39 relying on HMI technology may be accessed through visual display 38 to present audio content and level mode balance capabilities via the HMI interface (visual display 38). The volume-level module 39 provides a vehicle occupant accessibility to the volume level of the wireless headphones 57. For example, the volume-level interface 39 may allow a user to view and modify the volume level of wireless headphones 57 paired to telematics unit 30. The volume-level module 39 may also enable the user to set a maximum volume level for the paired wireless headphones 57. This will enable the user to reduce the volume of the paired wireless headphones 57 so that vehicle occupants are not accidentally exposed to the audio content being output via the headphone speakers. Mode balanced audio is a method of interconnecting audio equipment to balance the volume levels of the audio output of such equipment (i.e., to reduce susceptibility of the user of one set of audio equipment to the audio output of one or more other sets of audio equipment).

The pushbutton(s) 34 allow manual user input into the telematics unit 30 to initiate wireless telephone calls and provide other data, response, or control input. Separate pushbuttons can be used for initiating emergency calls versus regular service assistance calls to the data center 20. Vehicle audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM, media streaming services (e.g., PANDORA RADIO™, SPOTIFY™, etc.), satellite radio, CD, DVD, and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions (i.e., capable of HMI graphical user interface implementation).

Audio system 36 may also generate at least one audio notification to announce such third-party contact information is being exhibited on display 38 and/or may generate an audio notification which independently announces the third-party contact information. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more cellular network infrastructures (CNI) 72, as well as any other networking components required to connect wireless carrier system 14 with land network 16. Each cell tower 70 includes sending and receiving antennas and a base station, with the base stations from different cell towers being connected to the CNI 72 either directly or via intermediary equipment such as a base station controller. Cellular system 14 can implement any suitable communications technology, including for example, analog technologies such as AMPS, or the newer digital technologies such as, but not limited to, 4G LTE and 5G. As will be appreciated by skilled artisans, various cell tower/base station/CNI arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to data center 20. For example, land network 16 may include a public switched telephone network (PSTN) such as that used to provide hardwired telephony, packet-switched data communications, and the Internet infrastructure (i.e., a network of interconnected computing device nodes). One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, data center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer (e.g., a SIP Presence server) where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or data center 20, or both. A computer 18 can also be used for providing Internet connectivity such as DNS services or as a network address server that uses DHCP or other suitable protocol to assign an IP address to the vehicle 12.

Data center 20 is designed to provide the vehicle electronics 28 with a number of different system backend functions and, according to the exemplary embodiment shown here, generally includes one or more switches 80, servers 82, databases 84, live advisors 86, as well as an automated voice response system (VRS) 88, all of which are known in the art. These various data center components are preferably coupled to one another via a wired or wireless local area network 90. Switch 80, which can be a private branch exchange (PBX) switch, routes incoming signals so that voice transmissions are usually sent to either the live adviser 86 by regular phone, backend computer 87, or to the automated voice response system 88 using VoIP. Server 82 can incorporate a data controller 81 which essentially controls the operations of server 82. Server 82 may control data information as well as act as a transceiver to send and/or receive the data information (i.e., data transmissions) from one or more of the data bases 84 and telematics unit 30.

Controller 81 is capable of reading executable instructions stored in a non-transitory machine readable medium and may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components. The live advisor phone can also use VoIP as indicated by the broken line in FIG. 1. VoIP and other data communication through the switch 80 is implemented via a modem (i.e., a transceiver), connected between the land communications network 16 and local area network 90.

Data transmissions are passed via the modem to server 82 and/or database 84. Database 84 can store account information such as vehicle dynamics information and other pertinent subscriber information. Data transmissions may also be conducted by wireless systems, such as 802.11x, GPRS, and the like. Although the illustrated embodiment has been described as it would be used in conjunction with a manned data center 20 using live advisor 86, it will be appreciated that the data center can instead utilize VRS 88 as an automated advisor or, a combination of VRS 88 and the live advisor 86 can be used.

Figure 2:
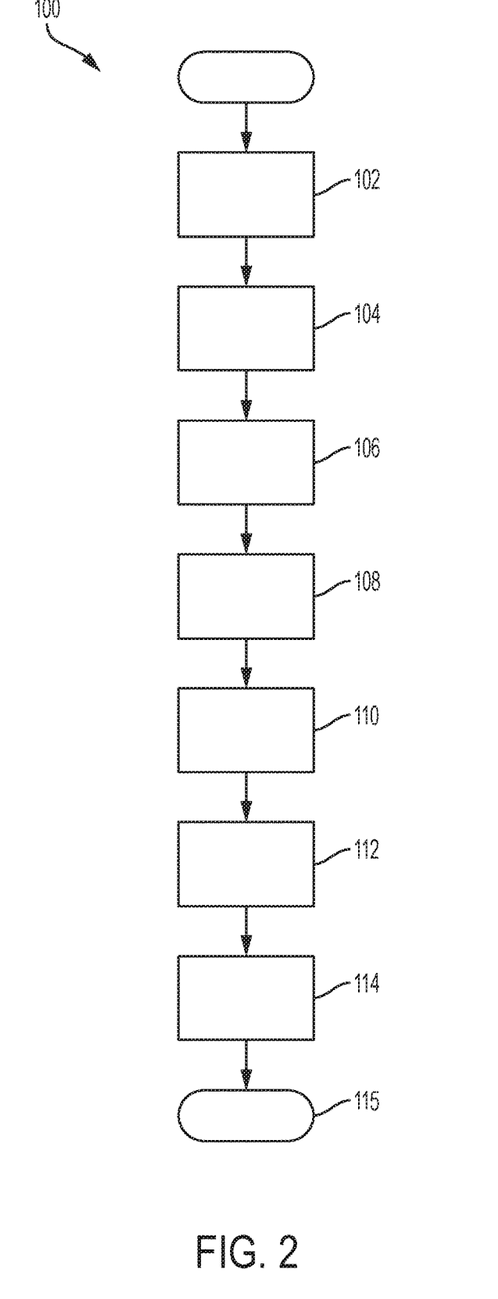
FIG. 2 is a flow chart depiction of an exemplary implementation of volume-level module.

An exemplary method for implementing volume-level module 39 is shown in FIG. 2 as reference number 100. Aspects of this method can be executed through telematics unit 30, for example, to provide a user interface for module 39 (e.g., via display 38) and to limit the audio output being directed to one or more wireless devices 57. Aspects of this method can also be executed through wireless device 57, for example, to provide dynamic audio sound through one or more speakers. Aspects of this method may alternatively be executed through computer 18 and/or server 82, for example, in certain instances, to store a backend version of volume-level module 39 and provide the module's frontend user interface features to telematics unit 30 when required.

Method 100 is supported by communication system 10. The method 100 is also supported by telematics unit 30 being configured to support the features of volume-level module 39 and to receive one or more commands to launch and implement volume-level module 39. The method 100 is further yet supported by telematics unit 30 being configured to establish a vehicle interior SWRC with one or more wireless devices 57 (e.g., wireless headphones or earbuds). Such configurations may be made by a vehicle manufacturer at or near the time of the telematics unit's assembly or after-market (e.g., via vehicle download using the aforedescribed communication system 10 or at a time of vehicle service, just to name a couple of examples). The method 100 is even further yet supported by wireless device 57 being configured to alternatively establish the vehicle interior SRWC with telematics unit 30.

The method begins with step 102, in which telematics unit 30 is commanded to launch and implement volume-level module 39. In step 104, when more than one wireless device 57 is detected, method 100 selects the wireless device with the highest priority. The presence of multiple wireless devices 57 might occur because, for example, there are multiple occupants with wireless devices 57 in the vehicle. Determining priority between multiple detected wireless devices can be done in any of a number of ways. For example, telematics unit 30 can ignore any detected devices that have not previously been setup, synchronized, or otherwise connected to the telematics unit. Where multiple devices are detected that have been synchronized or otherwise previously used with the telematics unit, priority between them may be pre-established or may be specified in response to prompting by telematics unit 30 or volume-level module 39. Specifying the priority can be done by having the vehicle operator or telematics service subscriber identify a priority between multiple wireless devices that have been or will be connected to the vehicle, or can be done by having just one wireless device identified as the primary one and always giving it priority over others that are detected.

In step 106, through one or more module commands provided to module 39, telematics unit 30 establishes SRWC with the selected wireless device 57 present within the vehicle interior. In step 108, telematics unit 30 directs an audio output from a single audio source to both the wireless device 57 and the vehicle audio system 36. As follows, when the audio source is a radio station, the output signal from that radio station will be simultaneously played in the vehicle interior as well as through the speakers of wireless device 57. Thus, non-wireless device using occupants in the vehicle interior will hear the same radio station content as an occupant wearing the wireless device 57. In step 110, telematics unit 30 will balance the volume of the audio output between wireless device 57 and telematics unit 30. Thus, the volume of the music being played through the vehicle audio system 36 should relatively match the volume being played through the wireless device 57. This allows vehicle occupants using telematics unit 30 to listen to sound coming from audio system 36 so as to experience a comparative sound volume level as the one coming from wireless device 57. In step 112, the balanced volume can be dynamically adjusted to a selected volume through one or more commands received by volume-level module 39. For instance, the selected volume can be set as the maximum volume level for the wireless device 57 deemed acceptable by the occupant controlling and commanding telematics unit 30. In step 114, in response to these commands, telematics unit 30 will automatically limit the audio output directed to wireless device 57 to a volume that is comparable to the selected volume. For example, the occupant using volume-level module 39 may accept a maximum volume that is limited to one they have determined to be acceptable.

It should be understood that the occupant may make this determination by listening to sound in the vehicle interior via audio system 36 or they may make the determinations by listening to sound via wireless device 57 (e.g., by wearing the headphones/earbuds). It should also be understood that front seat occupants operating an HMI (i.e., infotainment system) at the telematics unit 30 may have the ability to adjust the volume to a wireless device 57 paired with a rear seat HMI (i.e., infotainment subsystem) wired to telematics unit 30. After step 114, method 100 may optionally record and store the selected volume as a maximum volume level setting associated with the selected wireless device 57 to digital memory device 54 or databases 84. After step 114, method 100 moves to completion 115.

Figure 3:
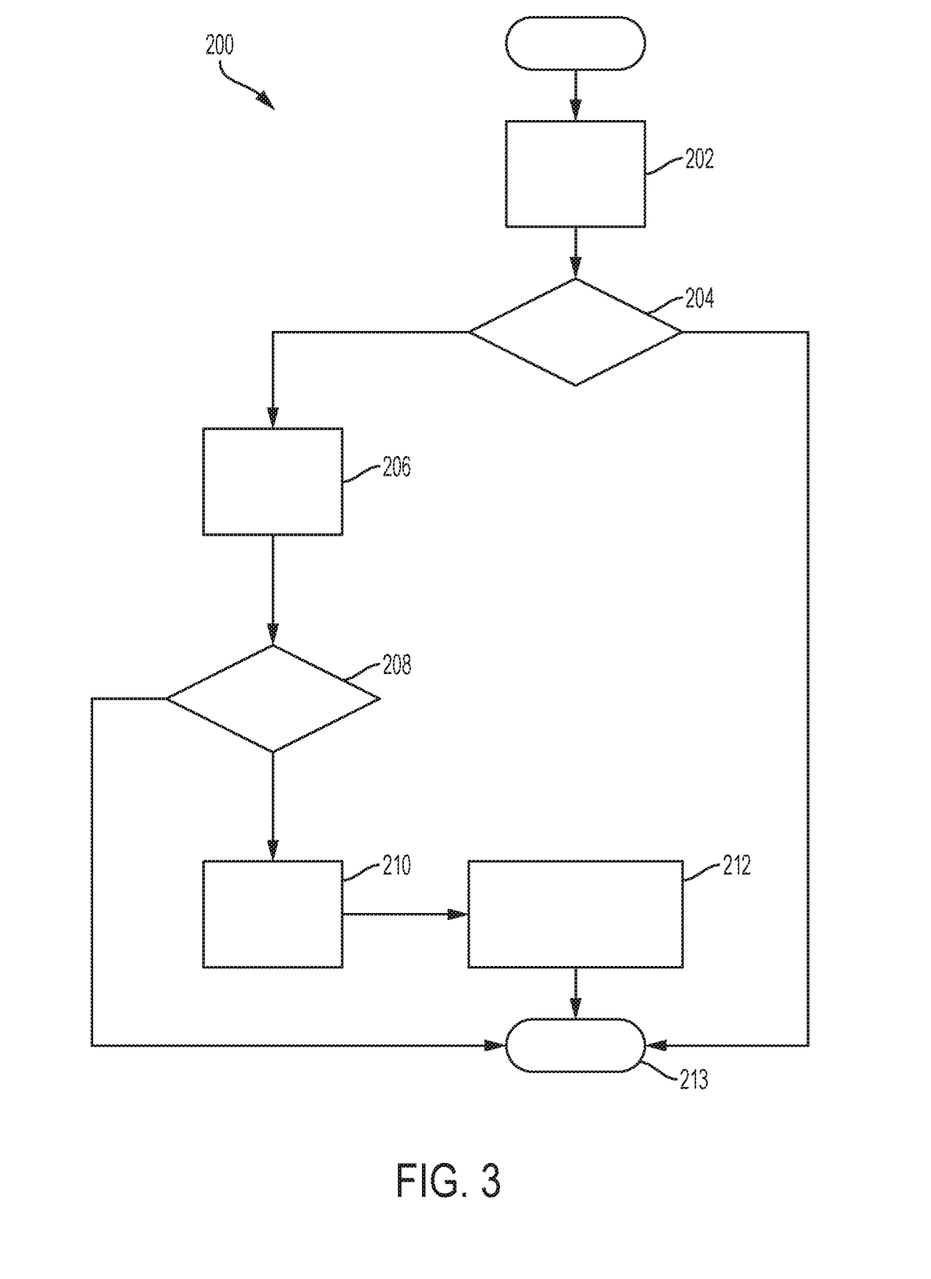
FIG. 3 is a flow chart depiction of another exemplary implementation of volume-level module.

Another exemplary method for implementing volume-level module 39 and creating volume level settings for newly registered wireless devices 57 is shown in FIG. 3 as reference number 200. Aspects of method 200 can be executed through telematics unit 30, for example, to provide a user interface for module 39 (e.g., via display 38) and to limit the audio output being directed to one or more wireless devices 57. Aspects of this method can also be executed through wireless device 57, for example, to provide dynamic audio sound through one or more speakers. Aspects of this method may alternatively be executed through computer 18 and/or server 82, for example, in certain instances, to store a backend version of volume-level module 39 and provide the module's frontend user interface features to telematics unit 30 when required.

The method begins with step 202, in which telematics unit 30 is commanded to launch and implement volume-level module 39. In step 204, telematics unit 30 determines if at least one unregistered wireless device 57 is present in the vehicle interior. If no unregistered wireless devices 57 are present, method 200 moves to completion 213. Otherwise, method 200 moves to step 206.

In step 206, method 200 begins the process of establishing an initial SRWC with an unregistered wireless device 57. As such, telematics unit 30 will retrieve (when pulled) or receive (when pushed) the general identifier (ID) information from wireless device 57. From this ID information, telematics unit 30 will automatically generate a tag name to designate the wireless device 57. For example, this tag name may be a random sequence of characters, special characters, and/or numbers (e.g., Aby345$, D0n$p#0n3, 34%$ERV, etc.). The tag name may also correspond to information previously registered in wireless device 57 (e.g., Stan Headphones, JCP UltraMax, etc.). After being generated, this tag name will be exhibited on display 38. Once displayed, the occupant may be prompted to modify the tag name to something personal/familiar. For example, the occupant may modify the tag name to their own name or some variation thereof (e.g., David Settings (1), Rick's Max Volume, etc.). The tag name may also be saved to digital memory device 54 or databases 84.

In step 208, display 38 will prompt the occupant to establish a selected volume for the wireless device 57. If the occupant chooses to establish the selected volume, method 200 will move to step 210. Otherwise, method 200 will move to completion 213.

In step 210, telematics unit 30 directs an audio output from a single audio source to both the wireless device 57 and the vehicle audio system 36. In this step, as discussed above in more detail, telematics unit 30 will also balance the volume of the audio output between wireless device 57 and telematics unit 30. In step 212, the balanced volume can be dynamically adjusted to a selected volume through one or more commands received by volume-level module 39. In response to these commands, telematics unit 30 will moreover automatically limit the audio output directed to wireless device 57 to a volume that corresponds with the selected volume. It should be understood that the occupant may make this determination by listening to sound through audio system 36 or they may make the determinations by listening to sound via wireless device 57 (e.g., by wearing the headphones/earbuds). In this step, the selected volume level will also be recorded/stored with the tag name that corresponds with the selected wireless device 57 to digital memory device 54 or databases 84. After step 212, method 200 moves to completion 213. As such, after a tag name and selected volume level have been saved, an occupant can use volume-level module 39 and be prompted to quickly choose a preset volume level for a wireless device 57 at the time of its pairing (i.e., when the SRWC is established).

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method of remote volume adjustment through a telematics unit, the method comprising:
   wherein the telematics unit is installed in a vehicle, the telematics unit comprising a display, and the telematics unit is for vehicle services, roadside assistance-related services, diagnostic reporting services, and infotainment-related services;

establishing a short-range wireless connection (SRWC), via the telematics unit, with a wireless device present within the interior of the vehicle;

receiving, via the telematics unit, one or more commands to set a maximum volume level for the wireless device;

limiting, via the telematics unit, the audio output directed to the wireless device to the maximum volume level and storing, via the telematics unit, the maximum volume level setting associated with the wireless device on a memory of the telematics unit such that, after having been stored, an occupant can be prompted to choose the maximum volume level setting via a volume-level module interface provided on the display.

2. The method of claim 1, further comprising:

directing, via the telematics unit, an audio output from a single audio source to both the wireless device and vehicle audio system; and balancing, via the telematics unit, the volume of the audio output between the wireless device and telematics unit.

3. The method of claim 1, further comprising the step of selecting, via the telematics unit, one wireless device from a plurality of wireless devices based on a priority system associated with the plurality of wireless devices, wherein the telematics unit provides priority to one or more wireless devices from the plurality of wireless devices that have previously been synchronized with the telematics unit.

4. The method of claim 1, further comprising:

receiving, via the telematics unit, general identification (ID) information for at least one wireless device;

establishing, via the telematics unit, a tag name for the at least one wireless devices, the tag name based on the ID information; and exhibiting, via the telematics unit, the tag name on the display.

5. The method of claim 1, wherein the SRWC protocol is Bluetooth, Bluetooth Low Energy, or Wi-Fi.

6. The method of claim 1, wherein the wireless device is a pair of wireless headphones or wireless earbuds.

7. A system for volume adjustment for a wireless device present in the interior of a vehicle, the system comprising:

a memory located in a telematics unit installed in the vehicle, the memory comprising one or more executable instructions;

a controller located in the telematics unit, the controller configured to read and execute the one or more executable instructions;

wherein the telematics unit comprises a display, wherein the telematics unit is for vehicle services, roadside assistance-related services, diagnostic reporting services, and infotainment-related services; and wherein the executable instructions enable the controller to:

establish a short-range wireless connection (SRWC) with the wireless device while present within the interior of the vehicle;

receive one or more commands to set a maximum volume level for the wireless device;

limit the audio output directed to the wireless device to the maximum volume level and store the maximum volume level setting associated with the wireless device on the memory such that, after having been stored, an occupant can be prompted to choose the maximum volume level setting via a volume-level module interface provided on the display.

8. The system of claim 7, wherein the executable instruction further enable the controller to:

direct audio output from a single audio source to both the wireless device and vehicle audio system; and balance the volume of the audio output between the wireless device and telematics unit.

9. The system of claim 7, wherein the executable instruction further enable the controller to select one wireless device from a plurality of wireless devices based on a priority system associated with the plurality of wireless devices, wherein the telematics unit provides priority to one or more wireless devices from the plurality of wireless devices that have previously been synchronized with the telematics unit.

10. The system of claim 9, wherein the executable instruction further enable the controller to:

receive general identification (ID) information for the wireless device;

establish a tag name for the wireless device, the tag name based on the ID information; and exhibit the tag name on the display.

11. The system of claim 7, wherein the SRWC protocol is Bluetooth, Bluetooth Low Energy, or Wi-Fi.

12. The system of claim 7, wherein the wireless device is a pair of wireless headphones or wireless earbuds.

13. A non-transitory and machine-readable medium having stored thereon executable instructions adapted to adjust the volume of a wireless device present in the interior of a vehicle, which when provided to a controller located in a telematics unit installed in a vehicle and executed thereby, causes the controller to:

establish a short-range wireless connection (SRWC) with the wireless device while present within the interior of the vehicle;

receive one or more commands to set a maximum volume level for the wireless device;

limit the audio output directed to the wireless device to the maximum volume level;

store the maximum volume level setting associated with the wireless device on the memory such that, after having been stored, an occupant can be prompted to choose the maximum volume level setting via a volume-level module interface provided on a display of the telematics unit; and wherein the telematics unit is for vehicle services, roadside assistance-related services, diagnostic reporting services, and infotainment-related services.

14. The non-transitory and machine-readable memory of claim 13, which further causes the controller to:

direct audio output from a single audio source to both the wireless device and telematics unit; and balance the volume of the audio output between the wireless device and vehicle audio system.

15. The non-transitory and machine-readable memory of claim 13, which further causes the controller to select one wireless device from a plurality of wireless devices based on a priority system associated with the plurality of wireless devices, wherein the telematics unit provides priority to one or more wireless devices from the plurality of wireless devices that have previously been synchronized with the telematics unit.

16. The non-transitory and machine-readable memory of claim 13, wherein:

which further causes the controller to:

receive general identification (ID) information for the wireless device;
establish a tag name for the wireless device, the tag name based on the ID information; and
exhibit the tag name on the display.

17. The non-transitory and machine-readable memory of claim 13, wherein the SRWC protocol is Bluetooth, Bluetooth Low Energy, or Wi-Fi.

* * * * *